United States Patent [19]

Niedermeyer

[11] 4,226,225

[45] Oct. 7, 1980

[54] THERMAL OVERLOAD RELEASE FOR SOLAR ENERGY COLLECTORS

[76] Inventor: William P. Niedermeyer, 1024 Mt. Mary Dr., Green Bay, Wis. 54303

[21] Appl. No.: 845,965

[22] Filed: Oct. 27, 1977

[51] Int. Cl.³ ............................. F24J 3/02; F16K 17/38
[52] U.S. Cl. ..................................... 126/422; 137/67; 137/74; 137/554; 220/89 B
[58] Field of Search .................... 220/89 A, 89 B, 201, 220/202, 361; 126/270, 422; 137/67–74

[56] References Cited

U.S. PATENT DOCUMENTS

| | | | |
|---|---|---|---|
| 2,608,201 | 8/1952 | Henry | 137/68 R |
| 2,622,122 | 12/1952 | Lennox | 220/89 A X |
| 2,694,503 | 11/1954 | Young et al. | 220/89 A |
| 3,972,442 | 8/1976 | Malcolm | 220/89 A |
| 4,043,317 | 8/1977 | Scharfman | 126/270 |
| 4,150,659 | 4/1979 | Buckley | 126/422 |

*Primary Examiner*—Martin P. Schwadron
*Assistant Examiner*—Richard Gerard
*Attorney, Agent, or Firm*—Francis J. Bouda

[57] ABSTRACT

This invention describes an inexpensive solar energy collector protective device that controls the flow of hot collector air within a pre-selected range. The device permits automatic opening of a vent, accomplished by a bi-metallic release or by rupturing of a separator. As a result of this construction, power failures, and the resultant failure of fluid pumping apparatus will not cause damage to the solar energy collector components. This protective device comprehends selection of inexpensive materials for internal components.

5 Claims, 11 Drawing Figures

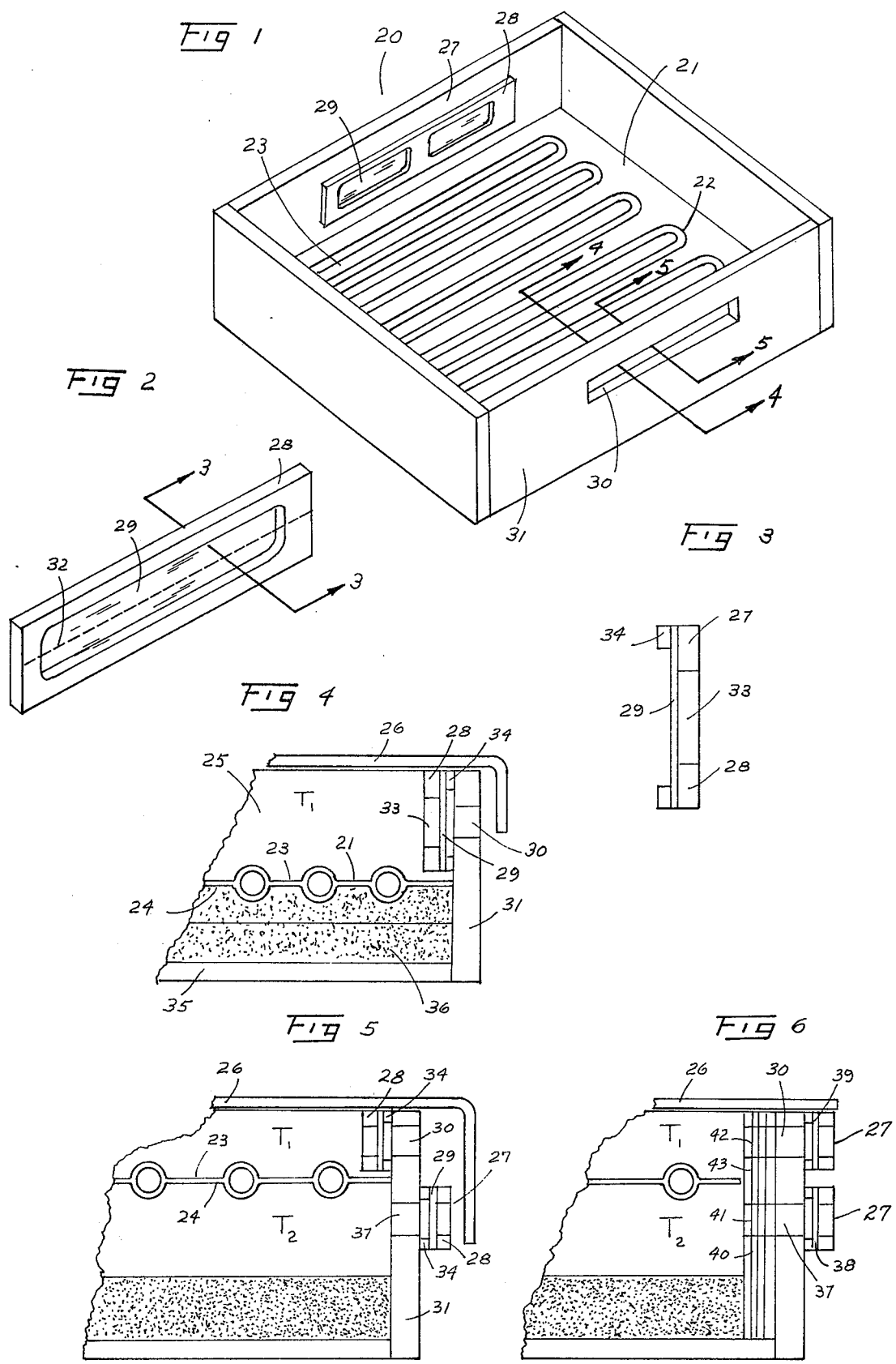

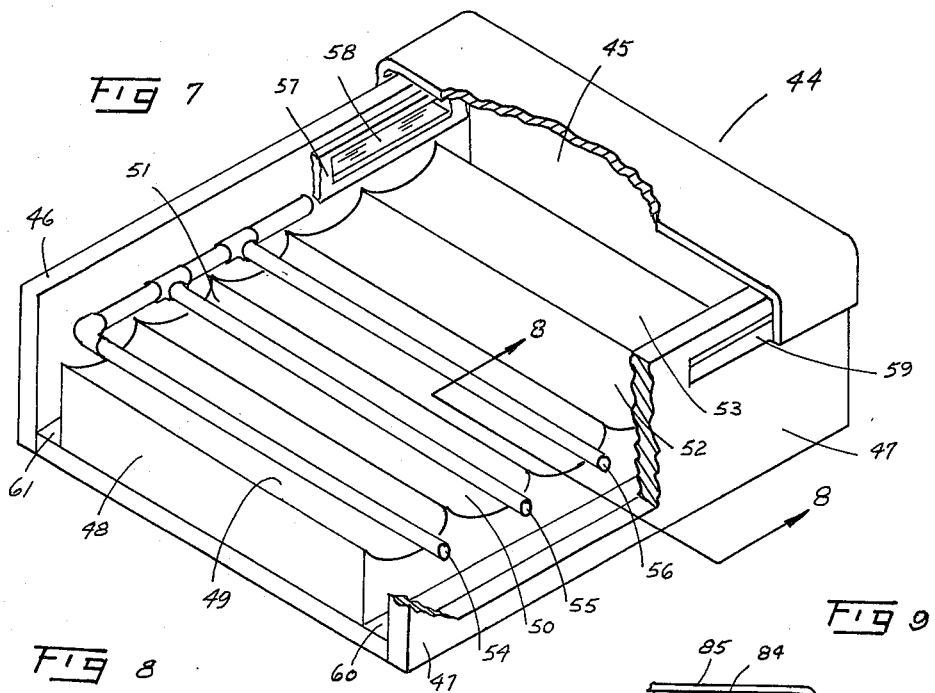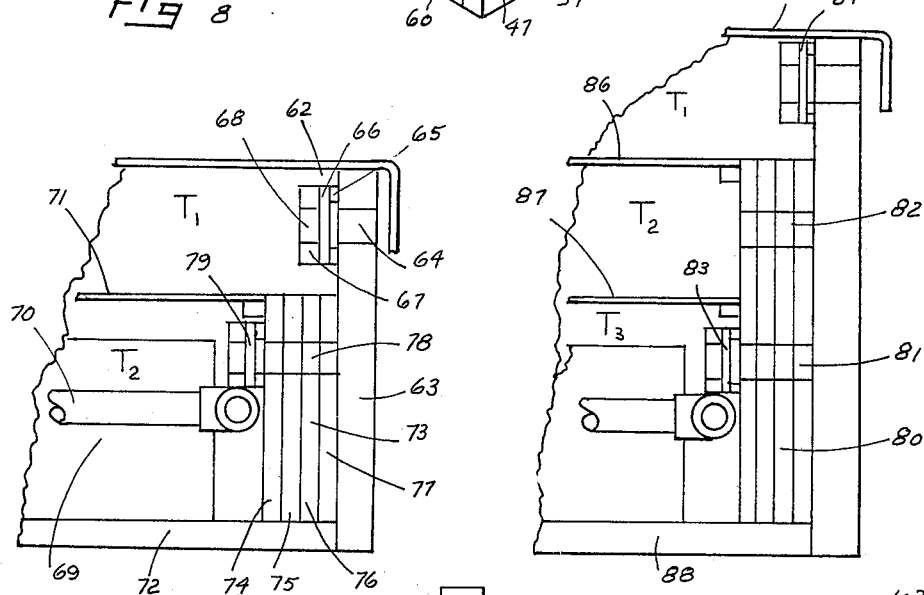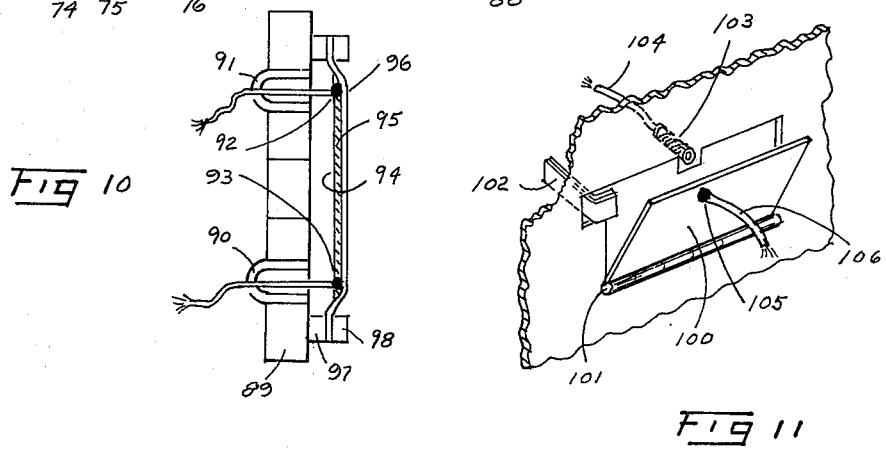

THERMAL OVERLOAD RELEASE FOR SOLAR ENERGY COLLECTORS

BACKGROUND OF THE INVENTION

Most of the available solar energy collectors for residential use are of "flat plate" construction. Parabolic or other types of concentrating collectors are becoming more practical and economically attractive, as they are capable of operation at higher temperature ranges.

The temperature within the collector panel is maintained at reasonable levels by heat transfer out of the panel to the fluid being pumped through the collector grid or piping circuits.

Failure of the pumping unit or a power failure will result in loss of flow, and the fluid temperature in the conduits (as well as the inside of the panel) can reach destructive levels.

Backup systems are not economically feasible since they require a reserve power source such as batteries, and hence cannot be considered dependable unless the electrical charge of the batteries is checked regularly.

Considering that power failures can result in extremely high temperatures inside of the panel, and the resultant possibility that severe component damage can occur, protective safety devices must be used.

With inexpensive non-metallic internal materials of construction, it is not economically practical or safe to rely solely on fireproofing treatment because of possible loss of effectiveness at elevated temperatures over extended periods of time.

According to present teaching and practice, most collectors are subjected to "stagnation" tests to determine a safe temperature operating range. In most instances the highest predictable temperature is the design criteria that dictates the selection of materials.

Material selection based on highest expected temperature plus a reasonable safety factor often results in an unnecessary requirement for materials that are relatively expensive and of considerable weight. Low density materials of construction generally have low thermal expansion characteristics and they tend to have lower ignition temperatures than do high density materials such as metals.

With the ambient temperature outside the panel always being well below the ignition temperature of the materials of construction, this invention describes the use of a device for opening a port in the side of the collector so that the hot air can escape. A preferred form of the automatic opener is a fusible plastic membrane which will soften, rupture, or liquify when reaching a predetermined temperature, thereby allowing outside air at ambient temperature to enter through apertures that are normally sealed off by the separator. When the separator ruptures or melts, heated air will escape and cooler ambient air will purge the inner cavity of the panel, thus maintaining internal temperatures below the ignition temperature of low density members.

Other safety systems may be used, but in the event that they fail, the inexpensive and replaceable nature of the device of the present invention makes it practical to use this device as the only protective means against damage from excessive heat.

OBJECT OF THE INVENTION

A primary object of this invention is to provide an automatic vent for solar energy collectors.

Another object is to provide a port-opening device to vent a solar energy collector.

Another object is to provide a protective device that will rupture before internal temperatures of the solar collector panel reach destructive levels.

A further object of this invention is to provide a thermal overload release device that is inexpensive and disposable after one-time use.

Another object is to provide a re-usable thermal overload release device for solar energy collectors.

A further object of this invention is to provide for easy replacement of the device after use.

A further object of this invention is to provide a plurality of protective devices that operate sequentially as temperatures increase in various internal zones of the collector.

Another object of this invention is to provide a ventilating device with an electrical control circuit such that opening or rupturing the device will cause circuit discontinuity and actuation of a warning device.

Additional objects of the invention will become clear in the detailed description which follows.

DESCRIPTION OF THE DRAWINGS

FIG. 1 is a perspective view of a flat plate solar energy collector showing one form of the thermal overload release device mounted therein.

FIG. 2 is an enlarged perspective view of the protective device of FIG. 1.

FIG. 3 is a cross section along line 3—3 of FIG. 2.

FIG. 4 is a cross sectional view along line 4—4 of FIG. 1.

FIG. 5 is a view similar to FIG. 4 showing a plurality of protective devices in a collector panel, said panel having a plurality of temperature zones and an extended removable cover.

FIG. 6 is a view similar to FIG. 5 showing preferred location of the protective devices when the panel cover is nonremovably fastened to the frame.

FIG. 7 is a perspective view of a linear concentrating type solar collector shown with apertures in the side frame and a protective device mounted oppositely thereto.

FIG. 8 is a cross section along line 8—8 of FIG. 7 showing a plurality of protective devices in preferred locations in a panel having double glazing.

FIG. 9 is a cross section similar to FIG. 8 showing preferred location of protective devices in a panel having three glazing members.

FIG. 10 is a cross sectional view similar to FIG. 3 showing a typical arrangement of a protective device that includes printed circuit components as part of a failure warning system.

FIG. 11 is a fragmentary view of a portion of a solar energy collector with another embodiment of the present invention mounted therein.

DESCRIPTION OF THE INVENTION

FIG. 1 shows a typical flat plate type solar collector 20. Plate 21 is painted or coated to absorb solar rays and transfer the collected heat to conduit 22, said conduit frequently being formed partly by upper surface 23 and partly by lower surface 24 (see FIG. 4) of the absorber plate.

In single glazed collectors like FIG. 4, the space 25 between absorber surface 21 and the cover 26 defines a single temperature zone $T_1$. When fluid stops flowing through conduits 22, the temperature in zone $T_1$ can reach destructive and dangerous levels. This invention relates to a protective device 27 (FIG. 3) which includes a support member 28 for a fusible member 29. The fusible member 29 is selected to rupture or melt at some predetermined temperature, said temperature $T_1$ being lower than a temperature $T_2$ at which any collector component will distort, fail, ignite, or otherwise become operatively ineffective. When the fusible member ruptures or melts, the overheated air in zone $T_1$ will blend with and be purged by ambient air passing interchangeably through frame opening 30.

For the purpose of this description, glazing is meant to be any transparent planar material such as glass, film, etc., said material separating one temperature zone from another. It is also noted that the term fusible includes, but is not limited to, characteristics such as becoming soft, having induced tension and stresses, rupturing, separating, melting, etc., said characteristics resulting from elevated temperatures during the transition from a solid to a liquid state.

In the preferred embodiment of FIG. 2, the support member 28 is made of semi-rigid material, for example, corrugated paperboard. The fusible member 29 is a thin plastic film selected to rupture or liquify at temperature $T_1$, and can be advantageously heat sealed or adhesively bonded to one side of support member 28.

In another embodiment, the plastic film 29 is perforated along a line 32 thereby providing a portion of plastic member 29 with a weakened line of resistance (32) having spaced-apart bonds and providing means to permit air transfer between the interior of the collector and ambient atmosphere to thereby prevent pressure buildup within the collector under normal operating conditions. Using films generically known as shrink film, the above-mentioned bonds become stressed when subjected to higher temperatures, and will rupture at a pre-selected temperature $T_1$. It is noted that numerous bond arrangements can be used in combination with one of many available film types, and with the proper selection of bond width, these variables will yield a protective device that will function as intended within a safe tolerance of $T_1$.

In FIG. 3 the protective device is shown with an aperture 33 in support member 28. The fusible plastic film 29 is shown between the support 28 and gasket 34.

In FIG. 4 all available space between the bottom of the collector plate 24 and the collector base 35 is filled with insulation 36, hence with proper selection of materials, elevated temperatures occur only in zone $T_1$, thus requiring the use of only one protective device as shown.

In certain embodiments, a second temperature zone $T_2$ per FIG. 5 can be protected from over-heating by using a separate protective device 27 mounted in operating relationship with a second aperture 37 in side frame 31. The panel in FIG. 5 is shown with a removable cover 26, and therefore device 27 is mounted on the outside of the frame.

FIG. 6 shows protective devices 27 and 27' mounted outside the frame as required for accessability when cover 26 is fixed to the frame. In this embodiment, insulating member 40 is of corrugated paperboard shown with apertures 41 and 42 arranged in co-acting relationship with side frame openings 37 and 30 respectively.

The corrugated flutes 43 operatively connect apertures 41 and 42, and thereby connect temperature zones $T_1$ and $T_2$. This has the beneficial effect of "blending" air volumes in zone $T_1$ and $T_2$, thus when the temperature of the blended air becomes elevated, the protective device(s) can function as intended. Despite the connecting air passages 41-43-42, temperature zone $T_1$ is more likely to overheat than $T_2$, therefore member 39 can be selected to rupture or melt at a higher temperature than member 38.

In other forms of this invention, insulator 40 could be made from expanded cellular type plastic materials, and apertures like 41-42 as well as vertically connecting passages equivalent to flutes 43 could be provided.

Parabolic type reflectors 44 shown in FIG. 7 can be designed for higher concentration ratios, and with higher output temperatures, are most beneficially used with absorption type air conditioning units. Mounted within side frame members 45, 46, 47, and 48 (not shown) a generally planar reflector surface having a plurality of parabolic surfaces 48, 49, 50, 51, 52, and 53, said reflector surfaces directing solar rays to a focal line falling within fluid circulating pipes 54, 55, 56, etc.

In FIG. 7, a protective device support member 57 having a fusible member 58 is located in working relationship to an aperture (not shown but similar to opening 59) in side frame 47. Spaces 60, 61 between the reflector 48 and side frame members 47 and 46 respectively are available for the use of side wall insulators as hereinafter described.

In FIG. 8, a protective device 62 is mounted against side frame 63 and in working relationship to aperture 64. A fusible plastic separator 66 is heat sealed or bonded to support member 67 which has an aperture 68 in cooperating alignment with aperture 64. The protective device can have resiliant gaskets 65 between the film 66 and side frame member 63 so that installation damage the film 66 and side frame member 63 so that installation damage is avoided and to provide a seal to minimize infiltration of ambient air into temperature zone $T_1$.

A typical parabolic reflector 69 focuses rays to conduit 70, however diffused radiation will also raise the temperature in the panel between glazing 71 and the collector base 72, said elevated temperature zone shown generally as $T_2$.

In the embodiment of FIG. 8 a side insulating member 73 is made of corrugated paperboard and has vertically oriented flutes 74, 75, 76, and 77 which, in combination with aperture 78, will allow air in temperature zone $T_1$ to blend with air in temperature zone $T_2$ when fusible member 79 melts or ruptures due to excessive temperature in either zone. When the temperature of blended air exceeds a predetermined maximum, a secondary fusible member 66 will melt or rupture thereby allowing ambient air to blend and thus lowering the temperature inside of the panel.

FIG. 9 shows the advantageous use of a corrugated member 80 having a plurality of apertures 81, 82 operatively connecting a plurality of temperature zones (ex: $T_1$ and $T_2$). Temperature zones are partially bounded by glazing members as follows: $T_1$ by 85 and 86, $T_2$ by 86 and 87, $T_3$ by 87 and base member 88. The zone most likely to produce the highest temperature can be protected by the overheat device, and when the temperature of air blended in $T_1$ and $T_2$ reaches the fusion temperature of plastic film member 83, the air mixture will be further blended with $T_3$. If the air from $T_1$, $T_2$, and $T_3$ are blended and reach excessive levels, fusible member 84 will degrade thus allowing ambient air to mix with the blended air to lower temperatures internal of the panel.

After protective devices function by rupture or melting, solar collectors can still function, but will be operating below normal efficiencies due to convective heat losses through the side wall apertures. This loss of operating efficiency may not be noticeable at certain times and would go undetected. By formulating the plastic film in any one protective device to have a fusion temperature of about 25 to 50 degrees F. below the film used in other protective devices, rupture or melting of this film would indicate the possibility that fusible members in other protective devices might have failed and should at least be inspected.

FIG. 10 shows the use of a conductive circuit printed on a substrate which is supported by or printed directly on the film. Support member 89 has three apertures, two of which act as receptacles for insulator caps 90 and 91, said caps having probes and contact points 92 and 93 (respectively) in operating contact with and near the ends of conductive strip 94. Strip 94 can be printed on a suitable substrate 95 which is supported by film 96, or could be directly printed on film 96. Proper insulation 97 and retainers 98 complete the assembly. When film 96 ruptures or melts, conductor strip 94 will be displaced from working contact from probe contact points 92 and 93, and thereby cause a discontinuity in a signal circuit (not described) which will indicate the need for replacement of the affected film and possible replacement of system protective devices.

In FIG. 11, I have shown an alternate form of ventilating the solar energy collector by automatically opening a door in a porthole to let the hot air escape.

In this embodiment, the door 100 is supported by hinged 101 over an aperture, and the door is held in place by the latch 102. In addition, the spring 103 on the frame constantly urges the door 100 to an open position and will do so if the latch 102 is released.

The latch 102 is a bi-metallic member which will bend as the temperature increases and can be adjusted so that the point at which the latch releases the door will take place at any desired temperature.

Additionally, the wire 104 is connected to the spring 103, and a second wire 106 is connected to a contact 105 in the door, and as long as the door is closed and locked in position by the latch 102, an electric circuit can be completed through wires 104 and 106 to indicate that the door is in a closed position.

However, when the temperature within the solar energy collector rises and the bi-metallic latch 102 moves to permit the door 100 to swing open, the electric circuit is broken and a signal is sounded to indicate that such an event has taken place.

It is to be understood that the present invention may be embodied in other specific forms without departing from the spirit or special attributes hereof, and it is, therefore, desired that the present embodiments be considered in all respects as illustrative, and, therefore, not restrictive, reference being made to the appended claims rather than to the foregoing description to indicate the scope of the invention.

I claim:

1. A solar energy collector including
   a solar ray absorption member,
   an enclosure for said solar ray absorption member wherein to trap solar heat,
   an opening in the enclosure whereby to vent the interior of the enclosure to the internal atmosphere,
   means in said opening to permit air transfer from the interior of the enclosure to the external atmosphere whereby to prevent pressure buildup within the enclosure under normal operating conditions,
   said means including a closure for the said opening,
   said closure comprising a thin, fusible membrane constructed arranged to rupture at a specified temperature,
   whereby the membrane will automatically rupture at a specified temperature so as to unclose the said opening and to vent the heated interior of the enclosure to the cooler external atmosphere.

2. The solar energy collector of claim 1 wherein the fusible membrane is a thin, flexible plastic film.

3. A solar energy collector of claim 2 wherein the thin, flexible, plastic film has at least one slit therethrough.

4. A solar energy collector of claim 1 wherein the fusible membrane contains a conductive strip on at least a portion thereof.

5. In a solar energy collector having a peripheral frame enclosing a solar ray reflector and the frame having an aperture,
   a thermo-overload release device including a closure for said aperture,
   said release device constructed and arranged to keep the barometric pressure substantially equal on each side of the closure,
   said closure being retained in closed position under conditions of lower temperature within the collector but automatically activated under conditions of elevated temperature therein so as to open the aperture,
   said closure comprising a plurality of thin-gauge, fusible plastic films disposed in spaced relationship to each other and defining a space there-between, said space providing a second temperature zone intermediate the interior and the exterior of the frame.

* * * * *